United States Patent
Walton et al.

(10) Patent No.: US 7,447,375 B1
(45) Date of Patent: Nov. 4, 2008

(54) COMPENSATION FOR EXPOSURE TIME VARIATION WHEN SCANNING WITH CCD SENSORS

(75) Inventors: Derek T. Walton, Bolton, MA (US); Brendan P. Mullaly, Nashua, NH (US)

(73) Assignee: Conexant Systems, Inc., Newport Beach, CA (US)

(*) Notice: Subject to any disclaimer, the term of this patent is extended or adjusted under 35 U.S.C. 154(b) by 780 days.

(21) Appl. No.: 11/032,458

(22) Filed: Jan. 10, 2005

Related U.S. Application Data

(60) Provisional application No. 60/535,402, filed on Jan. 9, 2004.

(51) Int. Cl.
*G06K 9/40* (2006.01)
(52) U.S. Cl. ...................................... 382/254
(58) Field of Classification Search ............... 382/254, 382/274–275; 348/241, 251, 207.99, 335, 348/229.12, 224.1, 222.1; 358/3.26–3.27
See application file for complete search history.

(56) References Cited

U.S. PATENT DOCUMENTS

| | | | |
|---|---|---|---|
| 6,831,687 B1* | 12/2004 | Suzuki | 348/251 |
| 7,092,581 B2* | 8/2006 | Winsor et al. | 382/274 |
| 2006/0033825 A1* | 2/2006 | Li et al. | 348/274 |

* cited by examiner

*Primary Examiner*—Sherali Ishrat
(74) *Attorney, Agent, or Firm*—John R. Thompson; Stoel Rives LLP

(57) ABSTRACT

A method of compensating for image intensity variation in a scanline of a scanned image caused by variation in sensor integration time in a non-shuttered CCD image sensor comprising the steps of (a) determining for the scanline a multiplicative compensation factor, Kc (b) multiplying the sensed intensity of light received by sensor elements present in the CCD image sensor for the scanline by Kc to produce a compensated intensity value for the scanline and (c) employing the compensated intensity value in an image processing pipeline to produce the scanned image.

6 Claims, 1 Drawing Sheet

COMPENSATION FOR EXPOSURE TIME VARIATION WHEN SCANNING WITH CCD SENSORS

REFERENCE TO PENDING PRIOR PATENT APPLICATION

This patent application claims benefit of pending prior U.S. Provisional Patent Application Ser. No. 60/535,402, filed Jan. 9, 2004 by Derek T. Walton et al. for COMPENSATION FOR EXPOSURE TIME VARIATION WHEN SCANNING WITH CCD SENSORS.

The above-identified patent application is hereby incorporated herein by reference.

FIELD OF THE INVENTION

This invention relates to office automation products in general, and more particularly to printers, fax machines, scanners, copiers and the like. Even more particularly, this invention relates to the integration of formerly separate functions into single devices such as those sometimes referred to as MFPs (Multi-Functional-Peripherals), and the integration of multiple functions into a single ASIC (Application-Specific Integrated Circuit) such as those produced by Oasis Semiconductor, Inc. of Waltham, Mass.

THE PROBLEM

Figure 1:
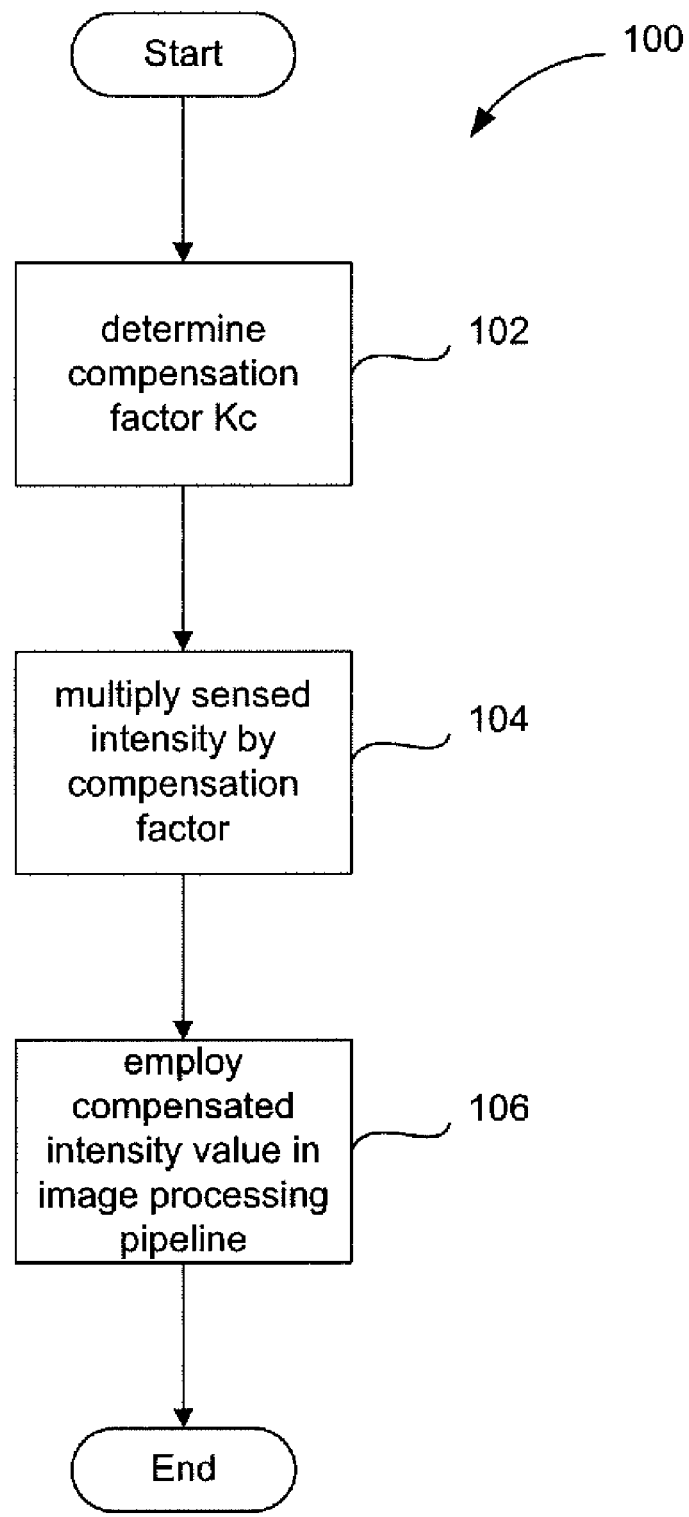
FIG. 1 is a flow chart of a method of compensating for exposure time variation when scanning with CCD sensors, according to one embodiment.

In developing an image scanning system, it is often advantageous if the system can tolerate some measure of variation in the scan speed. Scan speed variation, for instance, may exist in scanner systems which use a DC servo control loop for the scan mechanism. In this case, the actual scan mechanism velocity may deviate from the desired velocity, introducing scan speed variation. Scan speed variation may also occur by design. For instance, in some cases, it is useful for the scanning process to slow down or speed up based on the rate at which the output scan data is consumed.

As part of supporting variable speed scanning, it is necessary to scale the rate at which scanlines are sensed by the image sensor. To do this, the time between start-of-scanline pulses must be varied in a way which is coordinated with the scan speed variation. This can be done, for instance, by coupling the start-of-scanline pulse generation to the motor position, such that each time the motor moves by a fixed position increment a new start-of-scanline pulse is generated. In some cases, it may be necessary to interpolate motor positions between true measured positions in order to obtain vertical scan resolution higher than that of the motor position measurement system. Techniques such as these are fairly well established.

For CIS and CCD linear image sensors, the magnitude of the sensed image signal is determined by the incident light intensity and the integration time. The integration time is the time for which the CIS/CCD sensor elements are allowed to accumulate light. After the integration time has completed, a start-of-scanline pulse followed by a series of shift clocks are used to transfer the sequence of sensed pixels to the digitizer. Since the magnitude of the sense image signal is effected by the integration time, variation in integration time over the course of a scan can result in variation in image intensity from scanline to scanline. To avoid intensity variation, scan systems must keep the integration time constant during the course of a scan. For CCD devices with independent shutter gates and most CIS devices, the image sensor includes control signals which allow the integration time to be specified independent of the time between start-of-scanline pulses. However, for the cheapest CCD sensors, there is no way of independently controlling the integration time. The same signals which establish the time between start of-scanline pulses define the integration time. Thus, for systems built around the cheapest CCD sensors, the scanning system are typically defined to have very little variation in scan speed (any variation directly results in variation in image intensity from scanline to scanline).

DETAILED DESCRIPTION OF THE INVENTION

In our invention, we teach that digital processing can be used to compensate for scanline to scanline image intensity variation which result from variation in image sensor integration time. By using the invention's digital processing techniques, it is possible to support variable speed scanning with cheap (non-shuttered) CCD image sensors.

Intensity Compensation

When the sensor integration time is varied, the primary effect on the resultant image data is to increase or decrease the digitized intensity. Increasing the integration time will tend to increase the digitized intensity, while decreasing the integration time will decrease the digitized intensity. To compensate for the intensity variation, we use a multiplicative compensation factor Kc to scale the sensed intensity (Isensed) to approximate the intensity (Icompensated) which would have been received if the sensor integration time were to match some reference nominal time:

$$I\text{compensated}(x,y) = I\text{sensed}(x,y) * Kc(y)$$

where x represents the pixel position along a particular image sensor scanline, and y represents variation from scanline to scanline. Note that the compensation factor is likely to be different from scanline to scanline during the scan.

FIG. 1 is a flow chart of a method of compensating for exposure time variation when scanning with CCD sensors, according to one embodiment. At step 102, the method determines the compensation factor $K_c$. At step 104, the sensed intensity value is multiplied by the compensation factor $K_c$. Finally, at step 106, the compensated intensity value is employed in the image processing pipeline.

It is most convenient to think of the Kc compensation factor as being applied to pixels after black/shading correction but before gamma correction. This need not be the case; alternative positionings of the compensation are possible. Moreover, it is possible to build the compensation into the shading and/or gamma correction computations themselves, or other computations within the image processing pipeline.

It is also possible to imagine more sophisticated digital processing techniques than the linear compensation indicated above.

Determining the Kc Scale Factor

A variety of ways of developing the Kc scale factor can be imagined. We will enumerate a few by way of example.

Linear Function of Integration Time

Perhaps the simplest technique for generating the Kc scale factor is by assuming that Kc scales linearly with integration time. In this case, we can relate the Kc factor to be applied for a scanline to the integration time which was used in acquiring the scanline. For instance, $$Kc = T\text{nominal}/t$$

where Tnominal represents the nominal integration period, and t represents the integration period for the scanline for which Kc is being calculated.

Arbitrary Function of Integration Time

By using a table lookup, it is possible to make Kc an arbitrary function of integration time. This allow non-linear effects to be addressed, for instance.

```
if (t < 0.5 * Tnominal)
    index = 0;
else if (t >= 1.5 * Tnominal)
    index = NumberOfEntries – 1;
else
    index = NumberOfEntries * (t/Tnominal + 0.5);
Kc = LUT[index];
```

Empirically Determined from Reference Strip

It is also possible to determine the Kc value empirically, on a scanline by scanline basis. For instance, imagine that the field of view of the sensor is arranged such that a known reference strip is captured as part of each scanline. This reference strip would need to extend along the scan axis of the scanner mechanism. With such a reference, it would be possible to determine a Kc value to be applied to each scanline. For instance, an average intensity could be determined for the region of the scanline associated with the reference strip (IsensedAverage?), and the Kc value can be taken to be the ratio of the nominal average value for the reference strip to the measured average.

```
IsensedAverage = 0;
for (i=0; i<NUM_SAMPLES; i++) {
    IsensedAverage += Isensed(REFERENCE_STRIP_POSITION + i);
}
IsensedAverage /= NUM_SAMPLES;
Kc = InominalSensedAverage/IsensedAverage;
```

It will be appreciated that still further embodiments of the present invention will be apparent to those skilled in the art in view of the present disclosure. It is to be understood that the present invention is by no means limited to the particular constructions herein disclosed and/or shown in the drawings, but also comprises any modifications or equivalents within the scope of the invention.

What is claimed is:

1. A method of compensating for image intensity variation in a scanline of a scanned image caused by variation in sensor integration time in a non-shuttered CCD image sensor comprising the steps of:
   a. determining for said scanline a multiplicative compensation factor, Kc;
   b. multiplying the sensed intensity of light received by sensor elements present in said CCD image sensor for said scanline by Kc to produce a compensated intensity value for said scanline;
   c. employing said compensated intensity value in an image processing pipeline to produce said scanned image.

2. The method according to claim 1, wherein said method is employed between the image processing step of black/shading correction and the image processing step of gamma correction.

3. The method of claim 1, wherein Kc is determined by the formula:
   Kc=Tnominal/t, wherein Tnominal is the nominal integration period an t is the integration period for the said scanline.

4. The method of claim 1, wherein Kc is determined by using a table lookup.

5. The method of claim 1, wherein Kc is determined by using a reference strip that extends along a scan axis of the image sensor using the formula: Kc=Inominalsensedaverage/Isensedaverage, wherein Inominalsensedaverage is the nominal average intensity value for the reference strip, and Isensedaverage is the measured average intensity value for the reference strip.

6. A computer readable storage medium comprising computer readable instructions for performing a method of compensating for image intensity variation in a scanline of a scanned image caused by variation in sensor integration time in a non-shuttered CCD image sensor, wherein said method comprises the steps of:
   a. determining for said scanline a multiplicative compensation factor, Kc;
   b. multiplying the sensed intensity of light received by sensor elements present in said CCD image sensor for said scanline by Kc to produce a compensated intensity value for said scanline;
   c. employing said compensated intensity value in an image processing pipeline to produce said scanned image.

* * * * *

UNITED STATES PATENT AND TRADEMARK OFFICE
CERTIFICATE OF CORRECTION

PATENT NO. : 7,447,375 B1
APPLICATION NO. : 11/032458
DATED : November 4, 2008
INVENTOR(S) : Derek T. Walton et al.

It is certified that error appears in the above-identified patent and that said Letters Patent is hereby corrected as shown below:

Column 1, Line 66 reads, "...of the sense image..." and should read "...of the sensed image"

Column 1, Line 66 reads, "...image signal is effected by..." and should read "...image signal is affected by..."

Column 2, Line 10 reads, "...time between start of-scanline..." and should read "...time between start-of-scanline..."

Column 2, Line 12 reads, "...the scanning system are..." and should read "...the scanning systems are..."

Column 2, Line 21 reads, "...variation which result from..." and should read "...variation which results from..."

Column 3, Line 10 reads, "This allow non-linear..." and should read "This allows non-linear..."

Column 3, Line 20 reads, "...LUT[index];" and should read "...LUT[index]."

Column 3, Line 31 reads, "...(IsensedAverage?)..." and should read "...IsensedAverage)..."

Column 3, Line 42 reads, "...IsensedAverage;" and should read "IsensedAverage."

UNITED STATES PATENT AND TRADEMARK OFFICE
CERTIFICATE OF CORRECTION

PATENT NO. : 7,447,375 B1
APPLICATION NO. : 11/032458
DATED : November 4, 2008
INVENTOR(S) : Derek T. Walton et al.

It is certified that error appears in the above-identified patent and that said Letters Patent is hereby corrected as shown below:

Column 4, Line 22 reads, "...period an t is..." and should read "period and t is..."

Signed and Sealed this

Twelfth Day of May, 2009

JOHN DOLL
*Acting Director of the United States Patent and Trademark Office*